United States Patent [19]
Dillenschneider

[11] 3,831,657
[45] Aug. 27, 1974

[54] TIRE HAVING FOLDED TREAD-REINFORCEMENT PLY WITH CORD IN EACH FOLD

[75] Inventor: Jean Paul Dillenschneider, Beaumont, France

[73] Assignee: Compagnie Generale Des Etablissements Michelin raison sociale Michelin & Cie, Clermont-Ferrand, France

[22] Filed: Feb. 20, 1973

[21] Appl. No.: 333,731

[30] Foreign Application Priority Data
Feb. 25, 1972  France .................. 72.6964

[52] U.S. Cl. .............. 152/361 FP, 152/361 DM
[51] Int. Cl. ................................. B60c 9/00
[58] Field of Search ...... 152/361 FP, 361 DM, 175, 152/187

[56] References Cited
UNITED STATES PATENTS
| | | | |
|---|---|---|---|
| 3,018,814 | 1/1962 | Saint-Paul | 152/361 FP |
| 3,233,649 | 2/1966 | Jolivet et al. | 152/361 FP |
| 3,692,080 | 9/1972 | Bolleau | 152/361 FP |

FOREIGN PATENTS OR APPLICATIONS
102,826  10/1962  Netherlands ............... 152/361 FP Primary Examiner—M. Henson Wood, Jr.
Assistant Examiner—George H. Libman
Attorney, Agent, or Firm—Brumbaugh, Graves, Donohue & Raymond

[57] ABSTRACT

A radial tire having a tread reinforcement including at least one folded tread ply includes in each fold a longitudinal cord forming at least one turn, the ends of the cord being overlapping and not connected. This facilitates the manufacturing process and provides an improved tire.

2 Claims, 4 Drawing Figures

3,831,657

TIRE HAVING FOLDED TREAD-REINFORCEMENT PLY WITH CORD IN EACH FOLD

BACKGROUND OF THE INVENTION

This invention relates to pneumatic tires for automotive vehicles and, more particularly, to novel and highly-effective tires having a folded tread reinforcement and to a method of making such tires.

French Pat. No. 1,427,886 discloses tires having a radial carcass and a folded tread reinforcement. In one of the most important embodiments of such a tire, the tread reinforcement comprises a ply of elastic steel cords the edges of which are folded back and overlap the edges of another ply of steel cords, which may be elastic or inelastic. This structure is especially advantageous for tires intended for high-speed vehicles; it substantially improves the cornering properties and increases tread life and maximum speed. However, this structure is difficult to obtain with satisfactory precision and uniformity; despite the exercise of great care and manual skill, the builder does not always obtain a perfectly uniform fold line or avoid distortion of the edges of the folded ply.

SUMMARY OF THE INVENTION

An object of the present invention is to overcome these drawbacks and to facilitate the manufacture of tires having a folded tread reinforcement, while improving the quality of these tires, particularly with respect to the uniformity and regularity of the positioning of the cords of the tread reinforcement.

The method of the invention for the manufacture of a tread reinforcement comprising at least one ply with folded edges comprises the steps of superimposing plies on a building drum and turning up the edges to be bent. The method is characterized in that, after the placing of the unfolded plies on the building drum and before the turning up, at least one rubberized cord is placed at the position desired for any fold line, all around and on the ply to be folded, and the tread reinforcement is expanded radially so as to place the reinforcement and the rubberized cord under tension, cause them to adhere to each other, and clamp the reinforcement along the fold line.

In order to materialize the fold line and hold the ply to be folded along this line, there is preferably employed a cord or cable of elastic material, for instance of polyamide. One or more turns can be formed with this cord. The essential thing is that the two ends of the cord overlap over a sufficient distance to obtain good adherence when cold or at room temperature without preventing unwinding due to shrinkage when heated during the subsequent vulcanization.

The presence of a longitudinal cord at the fold of a tread ply presents no drawback in the finished tire. In particular, the cord does not separate from the surrounding rubber to form starting points for rupture.

In accordance with the method of the invention, the folding over of the edge of the ply is effected by engaging not the edge of the ply but a point intermediate the edge and the fold line. The folding is effected thus in part by pivoting and in part by an unrolling of the edge to be folded over, and not, as in the usual process, essentially by pivoting. This manner of proceeding considerably reduces the deformation of the edge of the ply, which is the most deformable zone.

The process thus defined has another important advantage. The presence in the tread reinforcement of stretched cords materially representing the fold lines as well as the tension induced in the folded ply have the effect that the finished tread reinforcement in the form of an annular sleeve retains the transverse curvature imparted to it on the building drum. One can thus obtain as desired a tread reinforcement which is perfectly cylindrical or which has the shape of a portion of a torus of greater or lesser curvature. This property subsequently facilitates the precise positioning and assembling of the tread reinforcement on a carcass. On the other hand, the absence of tension in the tread reinforcement made in the conventional manner permits an undesirable distortion and change in curvature.

The tire in accordance with the invention comprises a radial carcass and a folded tread reinforcement and is characterized in that every fold line of the tread ply is represented physically by a longitudinal cord placed within the fold, the cord forming one or more turns and having an interruption of its continuity at each end.

The fact that the cord does not form a continuous closed loop distinguishes the tire in accordance with the invention from conventional structures, which are not used and not usable, in which rings, similar to bead rings, are placed in the edges of a tread reinforcement.

BRIEF DESCRIPTION OF THE DRAWING

A better understanding of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
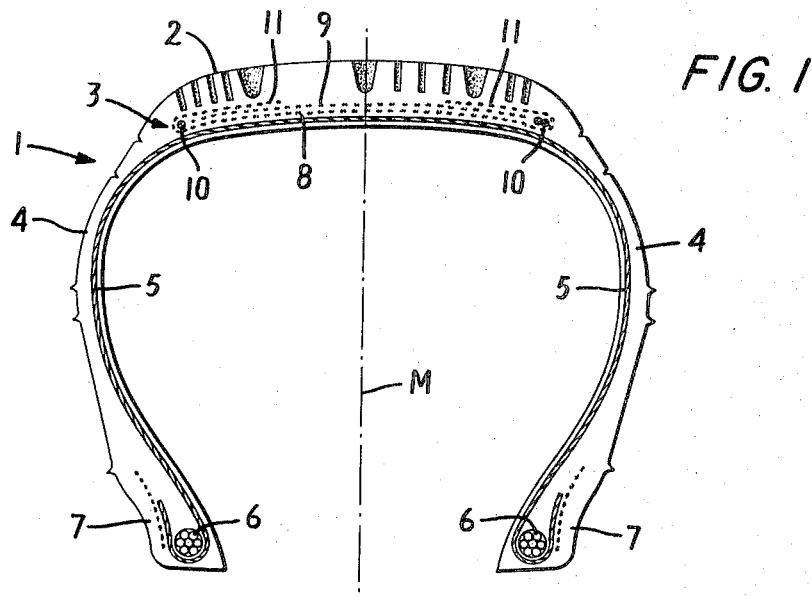
FIG. 1 shows in radial section a tire in accordance with the invention.

FIG. 1 shows a tire 1 comprising a tread 2, a tread reinforcement 3, sidewalls 4, and a carcass reinforcement 5 anchored around bead rings 6 located in the beads 7.

The tread reinforcement 3 is of the folded type and comprises two plies 8 and 9. The ply 8 comprises elastic steel cords and has its edges 11 folded in the direction towards the median plane M. The ply 9 comprises elastic or inelastic steel cords and is clamped between the ply 8 and the edges 11 of the latter.

In accordance with the invention, the fold lines between the ply 8 and its edges 11 are represented physically by a polyamide cord 10 which forms an angle of 0° with the longitudinal direction. This cord 10, which for clarity in the drawing is represented by means of a circle of intentionally exaggerated diameter, makes a single turn, and its free ends overlap over a distance of about ten centimeters. There can thus be noted on one side of the reinforcement two cords 10 placed side by side, since it has been assumed that the section has been taken in the region of the overlap of the ends.

Figure 2:
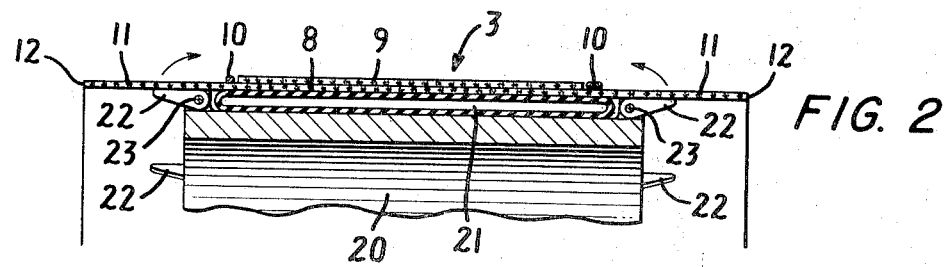
FIGS. 2, 3 and 4 show in radial section a tread reinforcement in accordance with the invention while being built on a drum.
Figure 3:
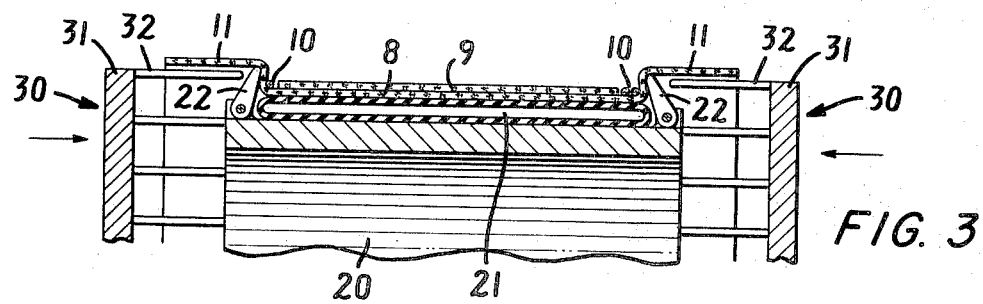
Figure 4:
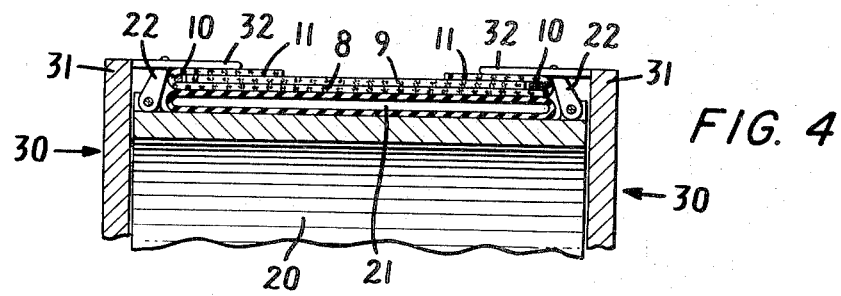

In FIGS. 2 to 4, the tread reinforcement is shown during the course of manufacture.

Around a building drum 20 provided with an inflatable flat membrane 21 there have been placed in succession the ply 8 and the ply 9, and the ends of each of these plies have been connected so as to form two coaxial closed rings. On the ply 8, near each of the edges of the ply 9, the circumferentially oriented cord 10 has been wound in one turn, with overlap of its ends over a distance of 10 to 20 centimeters. Since this cord is provided with a layer of adhesive rubber, it adheres easily to the ply 8, itself formed of steel cords coated with an adhesive rubber.

After the positioning of the elements as described above, the tread reinforcement 3 is expanded radially by inflation of the diaphragm 21. FIGS. 2 to 4 show the assembly after the inflation of the diaphragm. The tension produced by this expansion causes the cords 10 to penetrate slightly into the rubber of the ply 8 and produces firm adherence between the cords 10 and the ply 8. One can then proceed with the turning up of the edges 11 of the latter. For this purpose there are used strikers 22, pivoted at 23. A suitable mechanism (not shown) causes these strikers 22 to swing in the direction indicated by the arrows in FIG. 2, which produces an increase in diameter of the edges 11 of the ply 8. The strikers 22 act on the edges 11 of the ply 3 not at their end or terminus 12 but approximately at their center. When the strikers 22 have pivoted a quarter of a revolution and started the second quarter of a revolution, the edges 11 of the ply 8 have started their folding around the cords 10. There is then brought to each end of the drum 20 a coaxial device 30 comprising a plate 31 on the periphery of which fingers 32 are distributed over a circle whose diameter is greater than the diameter of winding of the cords 10 but less than the diameter of the circle along which the outer ends of the strikers 22 are located. The fingers 32 of these devices are positioned in such a manner as to be able to pass between the strikers 22 when the plates 31 which bear them are brought close to the drum 20, as indicated by the arrows in FIG. 3. This axial displacement of the plates 31 towards each other has the effect of pushing the edges 11 of the ply 8 back and placing them above the corresponding edges of the ply 9.

During the operations described above, the cords 10 firmly hold the ply 8 and avoid in particular its being injured by the ends of the cords of the ply 9.

After the edges have been applied to the ply 9 as shown in FIG. 4, one proceeds in a conventional fashion with a rolling which causes these edges to adhere to those of the ply 9 and expel the occluded air. The diaphragm 21 can then be deflated, the strikers 22 moved back, and the devices 30 removed, which makes it possible to free the finished tread reinforcement 3 and place it on an independently built carcass. The tread reinforcement 3 has the form of a rigid ring which easily retains its shape.

By way of example, in order to produce the tread reinforcement 3 of a tire of size 185 × 14, one can employ the following parts:

Ply 8

Elastic steel cords: three strands of seven wires of 0.15 mm with a pitch of 6 mm.
Angle of the cords: 26° left.
Spacing of the cords: 1.25 mm.

Ply 9

Inelastic steel cords: four wires of 0.23 mm with a pitch of 10 mm hooped by a wire of 0.12 mm with a pitch of 3.1 mm.
Angle of the cords: 20° right.
Spacing of the cords: 0.85 mm.

Cords 10

Nylon cord of a denier of 1,840/2.
Diameter: 0.7 to 0.8 mm.
Thickness of covering: 0.3 mm.
Angle of laying: 0°.

The invention is not limited to the case in which the plies 8 and 9 are composed of metal cords. It provides at least the same advantages when these plies include cords of another material, for instance fibers of glass, rayon, polyester, polyamide, etc.

The embodiments described above are merely exemplary, and those skilled in the art will be able to make many modifications and variations therein within the spirit and scope of the invention. Accordingly, the invention includes all such modifications and variations within the scope of the appended claims.

I claim:

1. A tire comprising a radial carcass, a tread reinforcement comprising at least one folded ply, and, in each tread ply fold substantially at the point of the fold, a longitudinal elastic cord forming at least one turn and not being a part of a ply extending continuously across the width of said tread reinforcement, the ends of said cord being overlapping and not connected.

2. A tire according to claim 1 wherein said tread reinforcement further comprises at least one unfolded ply.

* * * * *